United States Patent
Schaefer et al.

(10) Patent No.: US 7,339,882 B2
(45) Date of Patent: Mar. 4, 2008

(54) METHOD FOR FRAME AND FREQUENCY SYNCHRONIZATION OF AN OFDM SIGNAL AND METHOD FOR TRANSMITTING AN OFDM SIGNAL

(75) Inventors: Wolfgang Schaefer, Hildesheim (DE); Christian Hansen, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 681 days.

(21) Appl. No.: 10/473,631

(22) PCT Filed: Mar. 15, 2002

(86) PCT No.: PCT/DE02/00929

§ 371 (c)(1),
(2), (4) Date: Mar. 26, 2004

(87) PCT Pub. No.: WO02/078280

PCT Pub. Date: Oct. 3, 2002

(65) Prior Publication Data
US 2004/0146003 A1    Jul. 29, 2004

(30) Foreign Application Priority Data
Mar. 28, 2001  (DE)  ................................. 101 15 221

(51) Int. Cl.
*H04J 11/00*    (2006.01)
(52) U.S. Cl. ....................... 370/203; 370/350
(58) Field of Classification Search ................ 370/350, 370/503, 516, 343, 208, 203, 615
See application file for complete search history.

(56) References Cited

U.S. PATENT DOCUMENTS 4,716,574 A  * 12/1987  Baier et al. .................. 375/141

(Continued)

FOREIGN PATENT DOCUMENTS

DE    199 17 337    10/2000

(Continued)

OTHER PUBLICATIONS

Fechtel et al., *Fast Frame Synchronization*, . . . , IEEE International Symposium on Personal, Indoor and Mobile Radio Communications, 1993, pp. 229-233.

(Continued)

*Primary Examiner*—Kwang Bin Yao
*Assistant Examiner*—Andrew Lai
(74) *Attorney, Agent, or Firm*—Kenyon & Kenyon LLP (57) ABSTRACT

A method for frame and frequency synchronization of an OFDM signal and a signal for transmitting an OFDM signal is described, the purpose of which is to impress a pilot phase profile that is then used at the receiving end for frame and frequency synchronization on pilots which are already contained in the OFDM signal for channel estimation. This has the advantage that no additional transmission capacity has to be used for the synchronization. The method according to the present invention is initiated by a rough time synchronization unit connected upline, which searches for the beginning of the guard interval in the OFDM signal. The comparison between a stored pilot phase profile and the received subcarrier symbol is performed using a cross-correlation, whose result is then evaluated to determine the frame and frequency synchronization.

14 Claims, 4 Drawing Sheets

U.S. PATENT DOCUMENTS

| | | | |
|---|---|---|---|
| 5,274,629 A * | 12/1993 | Helard et al. | 370/208 |
| 5,627,863 A | 5/1997 | Aslanis et al. | |
| 5,732,113 A | 3/1998 | Schmidl et al. | |
| 5,912,876 A | 6/1999 | H'mimy | |
| 6,097,714 A * | 8/2000 | Nagatani et al. | 370/342 |
| 6,522,700 B1 * | 2/2003 | Zimmermann et al. | 375/295 |
| 2001/0005401 A1 * | 6/2001 | Ishida et al. | 375/295 |
| 2001/0033623 A1 * | 10/2001 | Hosur | 375/267 |
| 2002/0065047 A1 * | 5/2002 | Moose | 455/63 |
| 2002/0145971 A1 * | 10/2002 | Cho et al. | 370/208 |
| 2002/0159533 A1 * | 10/2002 | Crawford | 375/260 |
| 2003/0058968 A1 * | 3/2003 | Thomson et al. | 375/340 |

FOREIGN PATENT DOCUMENTS

| | | |
|---|---|---|
| EP | 0 961 448 | 12/1999 |
| FR | 2 758 031 | 7/1998 |
| HU | HU 9902101 | 10/1999 |
| HU | HU 0001298 | 8/2000 |
| JP | 7099486 | 4/1995 |
| JP | 10210000 | 8/1998 |
| WO | WO 96/02991 | 2/1996 |
| WO | WO99/56424 | 11/1999 |
| WO | WO 9956424 A1 * | 11/1999 |
| WO | WO02/078280 | 10/2002 |

OTHER PUBLICATIONS

Keller et al., *Orthogonal Frequency Division Multiplex Synchronisation Techniques...*, IEEE International Symposium *on Personal, Indoor and Mobile Radio Communications*, Oct. 1996, pp. 963-967.

Stefan Fechtel et al., "Fast Frame Synchronization, Frequency Offset Estimation and Channel Acquisition for Spontaneous Transmission Over Unknown Frequency-Selective Radio Channels," 1993, pp. 229-233 Aachen University of Technology, IS2, Aachen, Germany.

* cited by examiner

```
+-> carriers (k)
|
v
symbols (l)                              DC (not used)
                negative frequencies        :        positive frequencies
        1                                   :                                           1
        0..9..3333333322222222221111111111000000000:000000000111111111122222222223333333333..9..0
        3..1..8765432109876543210987654321098765432:123456789012345678901234567890123456789..1..3
                                                   :
   0  . .   ...O.....O.....O.....O.....O.....O....:O.....O.....O.....O.....O.....O.....O.   o  o
   1  . .   ....O.....O.....O.....O.....O.....O...:.O.....O.....O.....O.....O.....O.....    .  .
   2  o o   .O.....O.....O.....O.....O.....O.....O:.....O.....O.....O.....O.....O.....O..   .  .
   3  . .   ...O.....O.....O.....O.....O.....O....:O.....O.....O.....O.....O.....O.....O.   o  o
   4  . .   ....O.....O.....O.....O.....O.....O...:.O.....O.....O.....O.....O.....O.....    .  .
   5  o o   .O.....O.....O.....O.....O.....O.....O:.....O.....O.....O.....O.....O.....O..   .  .
   6  . .   ...O.....O.....O.....O.....O.....O....:O.....O.....O.....O.....O.....O.....O.   o  o
   7  . .   ....O.....O.....O.....O.....O.....O...:.O.....O.....O.....O.....O.....O.....    .  .
   8  o o   .O.....O.....O.....O.....O.....O.....O:.....O.....O.....O.....O.....O.....O..   .  .
   9  . .   ...O.....O.....O.....O.....O.....O....:O.....O.....O.....O.....O.....O.....O.   o  o
  10  . .   ....O.....O.....O.....O.....O.....O...:.O.....O.....O.....O.....O.....O.....    .  .
  11  o o   .O.....O.....O.....O.....O.....O.....O:.....O.....O.....O.....O.....O.....O..   .  .
  12  . .   ...O.....O.....O.....O.....O.....O....:O.....O.....O.....O.....O.....O.....O.   o  o
  13  . .   ....O.....O.....O.....O.....O.....O...:.O.....O.....O.....O.....O.....O.....    .  .
  14  o o   .O.....O.....O.....O.....O.....O.....O:.....O.....O.....O.....O.....O.....O..   .  .
```

METHOD FOR FRAME AND FREQUENCY SYNCHRONIZATION OF AN OFDM SIGNAL AND METHOD FOR TRANSMITTING AN OFDM SIGNAL

FIELD OF THE INVENTION

The present invention is directed to a method for frame and frequency synchronization of an OFDM signal and a method for transmitting an OFDM signal.

BACKGROUND INFORMATION

Within the framework of a worldwide consortium (DRM—Digital Radio Mondiale), a new digital radio transmission standard is being developed for the frequency range below 30 MHz. The multi-carrier method OFDM (orthogonal frequency division multiplexing) is to be used here as the modulation method (more precisely, a coherent OFDM transmission method is to be used). The OFDM signal is made up of OFDM symbols, each of which in turn contains subcarrier symbols. Subcarrier symbols predefined at the transmission end are designed as pilots, so that they may be used to enable channel estimation at the receiving end. The pilots are distributed among the subcarriers in the direction of time and frequency.

SUMMARY OF THE INVENTION

The method according to the present invention for frame and frequency synchronization of an OFDM signal and the method for transmitting an OFDM signal have the advantage that the pilots, which are already present anyway, are now also used on the receiving end for frame and frequency synchronization, by having a pilot phase profile that is unique within a frame impressed on the pilots at the transmission end. Each OFDM symbol of a frame is then distinguishable by its pilot phase profile. In that way the pilots are utilized for an additional purpose, and no additional transmission capacity needs to be provided for the frequency and frame synchronization.

In addition, the method according to the present invention for frame and frequency synchronization is distinguished by great robustness in the face of poor propagation and reception conditions. This may be increased by the use of a plurality of (different) pilot phase profiles of a transmission frame. It is also possible according to the present invention to perform the frequency and frame synchronization already within a transmission frame. This is because in the case of DRM (Digital Radio Mondiale) the OFDM symbols are distributed within the transmission frame.

In addition, it is advantageous that a larger capture range for a rough frequency estimate may be achieved by utilizing the distributed pilots. Using the pilot phase metrics, it is possible to clearly detect a frequency offset of more than half the signal bandwidth. Pilot phase metrics is used below to designate a calculation rule using which the pilot phase profile is compared at the receiving end with the received subcarriers or subcarrier symbols. The terms subcarriers and subcarrier symbols are used below as synonyms.

It is also advantageous that the received subcarrier symbols are compared with a stored pilot phase profile only downstream from an OFDM demodulater (DFT unit), since in this way a large number of pilot subcarriers whose main task is channel estimation may be used for synchronization purposes. For this reason the OFDM demodulation window must first be correctly placed, that is, a rough time synchronization must be carried out. To achieve a rough time synchronization, it is advantageous to search by means of autocorrelation for the guard interval in the received OFDM signal. The same method may also be used to achieve an estimate of a fine frequency offset. For a correct demodulation of the useful data, however, it is also necessary to determine the rough frequency offset, i.e., the integral multiple subcarrier frequency spacing. This is accomplished with the method according to the present invention.

It is advantageous that the comparison of the pilot phase profile having the subcarrier symbols which is split off at the receiving end is performed by using a cross-correlation, and the result of the cross-correlation is evaluated to determine the frame and frequency synchronization. The evaluation may be performed for example using a main to secondary peak ratio or a merit factor.

It is also advantageous that the pilot phase profile needed for the frame and frequency synchronization is determined by a pseudo-random series or a deterministic function. This function, like the pseudo-random series, is then known to the transmitting and receiving ends.

It is also advantageous that the pilots are distributed uniformly in an OFDM symbol, so as to achieve great robustness and optimal placement of the pilots for channel estimation.

A further advantage is the great robustness of the frame and frequency synchronization method in the face of noise interference. This robustness is achieved by using a large number of pilot subcarriers when calculating the pilot phase metrics.

Finally, it is also advantageous that a transmitter and a receiver are available to carry out the method according to the present invention.

DETAILED DESCRIPTION

Due to the difficult wave propagation conditions, especially with shortwave, great robustness must be demanded of the synchronization algorithms used. Determining and compensating for the frequency offset and locating the start of the frame are necessary conditions for ensuring the receipt of digital radio programs. Because of the narrow channel bandwidth and the associated low data rate, it is not possible to use a complete OFDM pilot symbol for synchronization purposes. Another requisite for correct demodulation of the useful data is an up-to-date channel estimation of the transmission channel.

According to the present invention, a pilot phase profile is thus impressed at the transmission end, so that frame and frequency synchronization is possible at the receiving end. Utilization of the method according to the present invention is of special interest for digital amplitude modulation (AM radio transmission), since the net bit rate is comparatively low in these applications.

Figure 1:
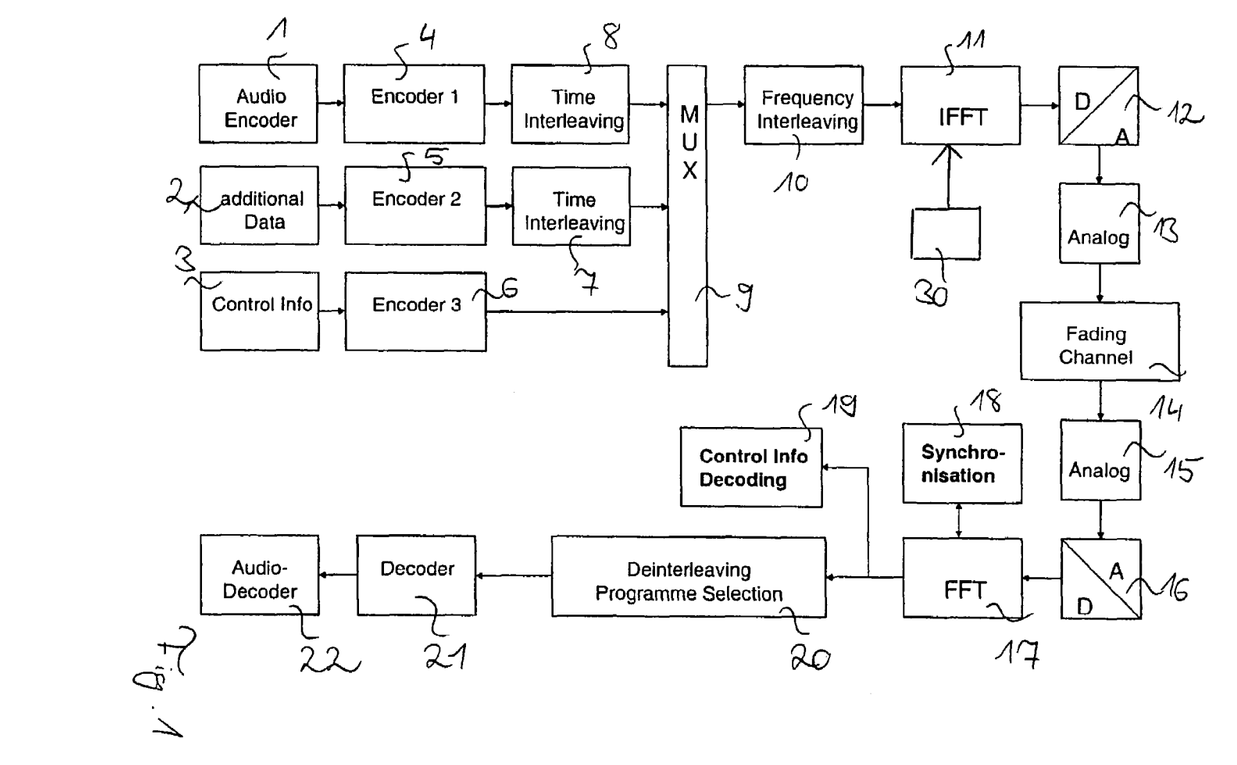
FIG. 1 shows a schematic block diagram of the complete transmission system.

FIG. 1 shows a schematic circuit diagram of the complete transmission system. An audio encoder 1, supplementary data 2 and control data 3 are present as data sources. They undergo encoding by encoders 4, 5 and 6 respectively. The audio and supplementary data thus encoded are then time-scrambled (interleaved) in blocks 8 and 7. A multiplexer 9 then joins the audio data, the supplementary data and the control data together into one data stream, which undergoes frequency interleaving in block 10 and an inverse discrete Fourier transformation in block 11. That produces OFDM modulation. Block 11 is therefore also referred to as the OFDM modulator. In OFDM modulator 11 the pilots having the pilot phase profile are added from a memory 30. In block 12 the OFDM signal thus produced is converted to an analog signal. In Block 13 transmission amplification and emission of the radio signals using an antenna take place.

The OFDM signal then reaches a receiver via a radio channel in a block 15, which has an antenna and a high frequency receiver. The received signals then undergo digitization in analog-digital converter 16. The samples thus obtained are now subjected in block 17 to a fast Fourier transformation (OFDM demodulation). The synchronization according to the present invention is also implemented here by block 18. In block 19 the control information contained in the data is decoded, while the descrambling, i.e., the de-interleaving of the audio and supplementary data, takes place simultaneously in block 20. Here too the program selection from the data stream is performed, i.e., for example which radio program is tuned in by the user. The selected data is decoded by a block 21, in order to perform audio decoding in block 22, so that at the output of audio decoder 22 audio data are present, which can be reproduced using a loudspeaker and an audio amplifier.

Pilots are added to the data to be transmitted in OFDM modulator 11. These pilots are used for channel estimation of transmission channel 14. In addition, a phase profile is now impressed on these pilots. This is referred to below as the pilot phase profile. The pilot phase profile is then used on the receiving end in block 18 for frame and frequency synchronization.

Figure 4:
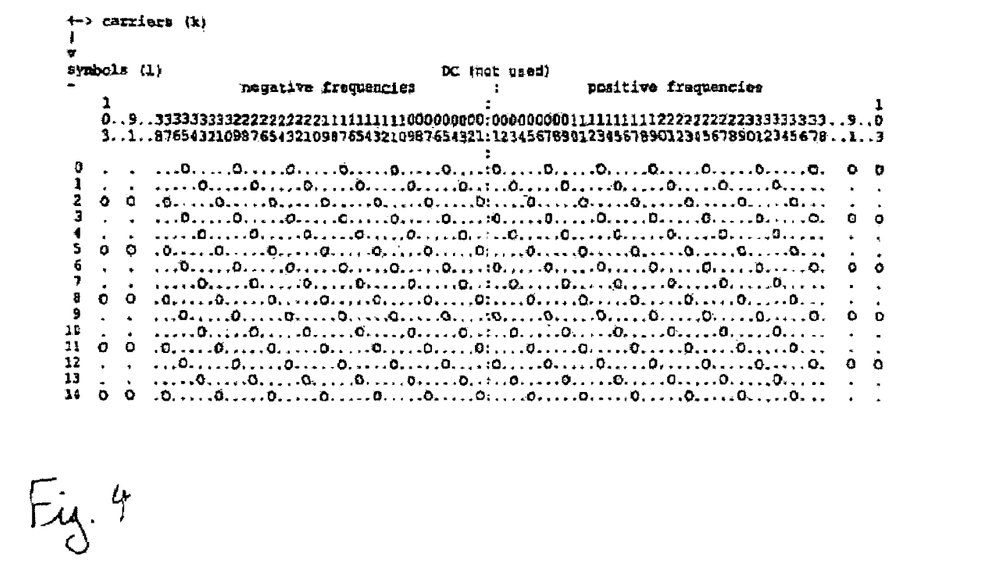
FIG. 4 shows a distribution of pilots in an OFDM symbol.

FIG. 4 shows a distribution of the pilot symbols in the direction of frequency and time, the pilots being identified with 0. With the use of coherent OFDM systems, such as are to be utilized for DRM, channel estimation with the use of pilot subcarrier symbols is necessary, since an equalization and a correct demodulation must be carried out. Through uniform distribution of the pilot subcarriers in the direction of frequency and time, good channel estimation is achieved. The data subcarriers are represented with a dot in FIG. 4. In general, it is not necessary in regard to reliable channel estimation to transmit a pilot symbol on every subcarrier, since transmission channel 14 changes with only a finite speed. Channel estimation for the subcarriers lying between two pilots is therefore achieved by interpolation.

For the quality of channel estimation, it is irrelevant what phases the pilot symbols have. Care should merely be taken to ensure that the crest factor of a multi-tone signal generated by pilot symbols is low. To keep the crest factor of a multi-tone signal low, the following simple phase law may be used (Equation 1). For the kth pilot subcarrier in the lth OFDM symbol, we may accordingly write $$P_{l,p(l,k)} = \sqrt{2} \cdot \tilde{W}_{p(l,k)} = \sqrt{2} \cdot e^{j\frac{\pi \cdot p(l,k)^2}{N_0}} \quad \text{Equation 1}$$

where p(l,k): index of a pilot subcarrier in the lth OFDM symbol of a frame
$N_0$: integral number.

It must be kept in mind that the phase of the pilot subcarriers depends only on the subcarrier index p(l,k) in Equation 1. If one adds an additional phase rotation $\phi_{RND}$(l,k), which is a function of the subcarrier index and the OFDM symbol, Equation 2 results $$P_{l,p(l,k)} = \sqrt{2} \cdot W_{p(l,k)} = \sqrt{2} \cdot e^{j\frac{\pi \cdot p(l,k)^2}{N_0}} \cdot e^{j\varphi_{RND}(l,k)} \quad \text{Equation 2}$$

The phase $\phi_{RND}$(l,k) here is a pseudo-random additional phase rotation. The value of the additional phase rotation is a function of the subcarrier index k and the OFDM symbol number l. The additional phase rotations may be stored in a phase matrix.

$$\phi_{RND} \mid N_{FRAME} \times N_{CARRIERS} = \begin{pmatrix} \varphi_{RND}(1,1) & \varphi_{RND}(1,2) & \cdots & \varphi_{RND}(1, N_{CARRIERS}) \\ \varphi_{RND}(2,1) & \varphi_{RND}(2,2) & \cdots & \varphi_{RND}(2, N_{CARRIERS}) \\ \cdots & \cdots & \cdots & \cdots \\ \varphi_{RND}(N_{FRAME}, 1) & \cdots & \cdots & \varphi_{RND}(N_{FRAME}, N_{CARRIERS}) \end{pmatrix}$$

where $N_{FRAME}$: number of OFDM symbols within a frame
$N_{CARRIERS}$: number of OFDM subcarriers The individual elements $\phi_{RND}$(l,k) here may come ideally from a pseudo-noise series. That achieves the greatest possible variation between the pilot phases of various OFDM symbols. Also conceivable is the use of a simpler phase law, as described in Equation 3.

$$\varphi_{RND}(l,k) = \frac{\pi}{N_0}k^2 \cdot l; \Rightarrow P_{l,p(l,k)} = \sqrt{2} \cdot e^{j\frac{\pi \cdot (1+l)}{N_0} \cdot p(l,k)^2} \quad \text{Equation 3}$$

where p(l,k) is {k for k=$k_l$+ixy; else 0}.

An additional alternative is the use of a phase law according to Equation 4:

$$\varphi_{RND}(l, p(l,k)) = \varphi_{RND}(l, k_l + ixy) = \quad \text{Equation 4}$$
$$\arg\{Z(l)\} + 2\pi \cdot xy \cdot \frac{T_G + l \cdot T_S}{T_U} \cdot i + 2\pi \cdot \frac{i^2(1+l)}{P_0}$$

In Equation 4 the symbols have the following meanings:
x: frequency sub-sampling factor
y: time sub-sampling factor
$T_G$: guard interval
$T_U$: usable symbol duration
$T_S$: OFDM symbol duration; $T_S = T_G + T_U$
$k_l$: index of the first pilot subcarrier in the lth OFDM symbol
p(l,k): index of a pilot subcarrier in the lth OFDM symbol of a frame; p(l,k)=$k_l$+ixy $P_0$: constant
i: index
$\arg\{Z(l,k_l)\}$: phase of the first pilot subcarrier in the lth OFDM symbol (=start phase for deterministic calculation of the other pilot subcarrier phases).

The phase values $\arg\{Z(l,k_l)\}$ are chosen as elements of a pseudo-noise series.

It is important that, by adding an additional phase rotation, a pilot phase profile that is unique within the transmission frame is produced. The exact calculation rule for determining the pilot phase profile plays a subordinate role for the proposed synchronization algorithm. If one wishes to perform a frame synchronization with the algorithm described below, then $\phi_{RND}(l,k)$ must be a proper function of l and k. If one chooses instead $\phi_{RND}(l,k)=f(l)$ or $\phi_{RND}(l,k)=f(l)+f(s)$, it is only possible to determine the rough frequency offset with the algorithm described below. For a frame synchronization from the distributed pilot arrangement, the pilot phases of various OFDM symbols must be sufficiently different, or—to express it in mathematical terms—$\phi_{RND}(l,k)=f(l,k)$ must therefore be a proper function of subcarrier index k and OFDM symbol number l. Also important is that $\phi_{RND}(l,k)=\phi_{RND}(l+N_{FRAME},k)$ apply. In general, the more "randomly" the pilot phases are chosen, the more possibilities open up for a synchronization algorithm.

The following explanation shows how a unique pilot phase profile may be used both for frame synchronization and to determine the rough frequency offset in a coherent OFDM system. Additional redundancy to the frame synchronization is avoided by this procedure.

Before the proposed synchronization algorithm may be used, a rough time synchronization must be performed to place the DFT (demodulation) window. A rough time synchronization may be achieved by calculating the correlation of parts of the guard interval with the corresponding segment at the end of the usable OFDM symbol. It is known that it is also possible to determine, using the same procedure, an estimate of the fine frequency offset ($\pm 0.5 \ 1/T_U$). Now still unknown, but indispensable for correct demodulation of the useful data, is the detection of the rough frequency offset (whole number multiple of the subcarrier frequency spacing $1/T_U$) and of the start of the frame. These may be determined using the following method.

The starting point for determining the rough frequency offset and the start of the frame is the calculation of a cross-correlation between the received subcarrier symbols R(l,k) with the pilot phase series W(l,p(l,k)). The calculation rule according to Equation 5 is referred to below as pilot phase metrics. Prerequisite for using the pilot phase metrics is that the beginning of the OFDM demodulation windows lies within the inter-symbol-interference-free (ISI-free) range of the guard interval.

$$\wedge(l, p(l, k), s, i) = \text{ABS}\left[\sum_k W^*(l, p(l, k)) \cdot W(l, p(l, k+1)) \cdot R(s, p(l, k)+i) \cdot R^*(s, p(l, k+1)+i)\right] \quad \text{Equation 5}$$

In equation 5 the symbols have the following meanings:
l: OFDM symbol number within a frame
p(l,k): index of a pilot subcarrier in the lth OFDM symbol of a frame
i: trial position for determining the rough frequency offset (index i runs in the frequency direction)
s: trial position for determining the frame start symbol (index s runs in the time direction)
ABS: absolute value
R(l,k): kth subcarrier symbol in the lth OFDM symbol.

Figure 5:
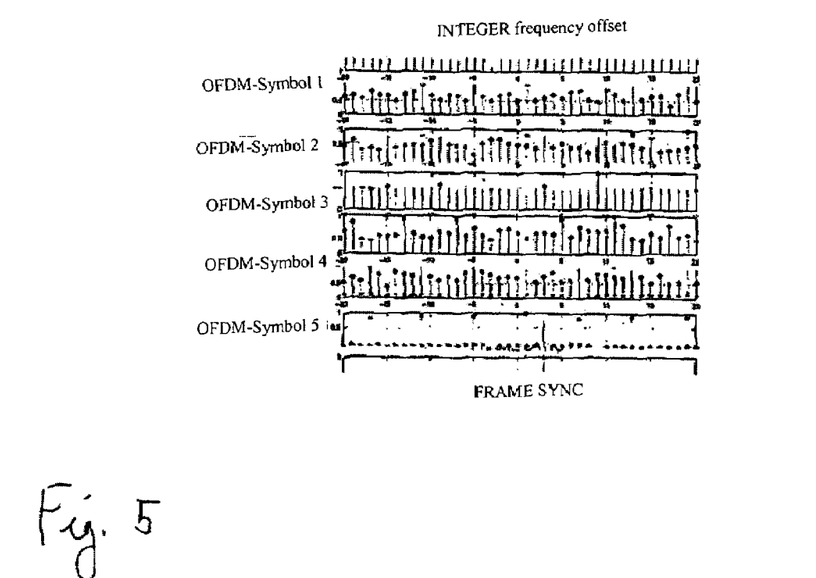
FIG. 5 shows an instance of pilot phase metrics for various OFDM symbols.

Equation 5 then furnishes a maximum value when the pilot phase series W(l,p(l,k)) agrees with the received subcarrier series R(s,p(l,k)+i). In all other cases the pilot phase metrics assume a small value when a pseudo-noise phase profile is used, due to the pseudo-noise character of the phase series. FIG. 5 illustrates this situation. To determine the rough frequency offset, Equation 5 must be calculated for several trial positions i.

If a deterministic pilot phase profile according to Equation 3 or Equation 4 is used instead, the pilot phase metrics become periodic with the pilot interval. In this case it is only possible to determine the start of the frame using Equation 5. The capture range for determining the rough frequency offset is restricted by the interval of the pilot subcarrier xy.

If even an exact time synchronization is known, Equation 6 may then be used as an alternative to locate the rough frequency offset and the start of the frame. In comparison to Equation 5, here the cross-correlation between the pilot phase series W(l,p(l,k)) and the received subcarrier symbols is calculated directly.

$$\wedge(l, p(l, k), s, i) = \text{ABS}\left[\sum_k W^*(l, p(l, k)) \cdot R(s, p(l, k)+i)\right] \quad \text{Equation 6}$$

Using Equation 6, a clear determination of the rough frequency offset is possible, with either a pseudo-noise phase profile or a deterministic phase profile according to Equation 3 or Equation 4.

To achieve a frame synchronization one may either correlate the received subcarrier symbols with all possible pilot phase series of a frame, or else one may correlate one pilot phase series with all received subcarrier symbols.

To improve the results of the estimation, one may not search only for one particular pilot phase profile W(l,p(l,k)), but for several at the same time, because according to Equation 3, the pilot phase profile for each OFDM symbol of a frame is unique. Mathematically, this means averaging the metrics results $\wedge(l,p(l,k),s,i)$ from Equation 5:

$$\overline{\wedge}(s, i) = \sum_{l=1}^{nb} \wedge(l, p(l, k), s, i) \quad \text{Equation 7}$$

where nb: number of OFDM symbols averaged together (1 ... $N_{FRAME}$)

Various measures of correlation quality may be defined to judge the matrix elements $\overline{\wedge}(s,\hat{i}_s)$, for example the HAW, which gives the ratio of the main peak $\overline{\wedge}(s,\hat{i}_s)$ at position $\bar{i}_s$ of the pilot phase metrics to the numerically largest secondary peak. The HNV must be calculated for all possible positions of the start of the frame (that is, a total of $N_{FRAME}$ times).

$$HNV(s, \hat{i}_s) = \frac{\overline{\Lambda}(s, \hat{i}_s)}{\max_i \{\overline{\Lambda}(s, i)\}\big|_{i \neq \hat{i}_s}} \quad \text{Equation 8}$$

Figure 6:
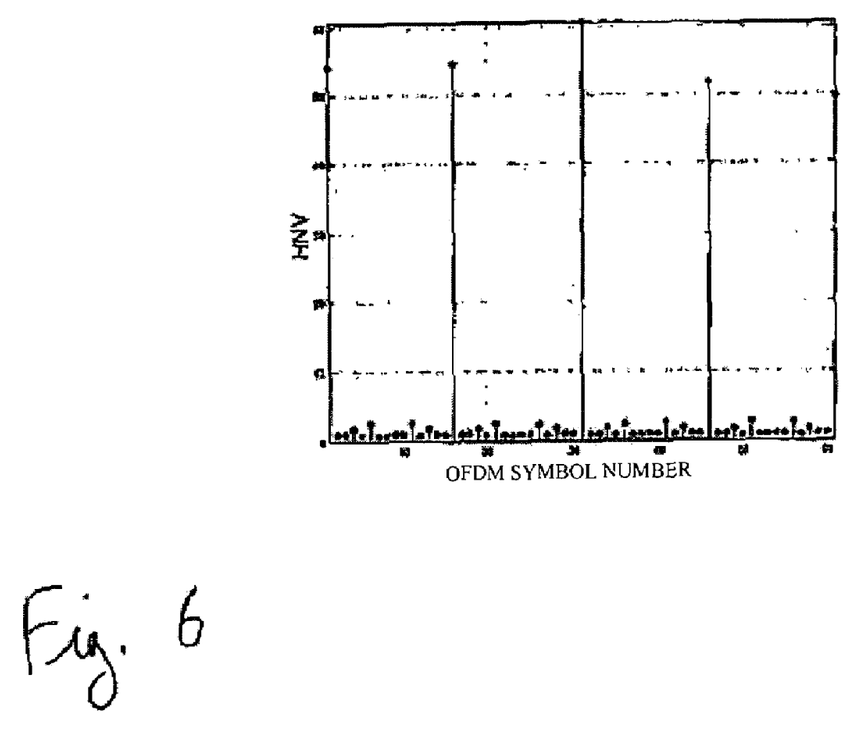
FIG. 6 shows main to secondary peak ratio values for a plurality of DRM frames.

FIG. 6 shows the HNV values for four DRM frames. The start-of-frame symbol is clearly recognizable in each case. A maximum detection of HNV furnishes:

$$HNV_{\max}(S_{\max}, i_{\max}) = \max_s \{HNV(s, \hat{i}_s)\} \quad \text{Equation 9}$$

The indices $s_{max}$ and $i_{max}$ in Equation 9 of the maximum HNV indicate the position of the start-of-frame symbol and the rough frequency offset. Similarly to the HNV the merit factor (MF) may also be used as a measure of correlation quality. The merit factor describes the ratio of the energy of the main value of the pilot phase metrics $\overline{\Lambda}^2(s,\hat{i}_s)$ to the entire energy contained in the secondary values. The evaluation algorithm for the frame and frequency synchronization is then:

$$MF(s, \hat{i}) = \frac{\overline{\Lambda}^2(s, \hat{i}_s)}{\sum_{\substack{i \\ i \neq \hat{i}_s}} |\overline{\Lambda}(s, i)|^2} \quad \text{Equation 10}$$

A maximum detection of MF furnishes:

$$MF_{\max}(S_{\max}, i_{\max}) = \max_s \{MF(s, \hat{i}_s)\} \quad \text{Equation 11}$$

Here too, the indices $s_{max}$ and $i_{max}$ of the maximum MF indicate the start-of-frame symbol or the rough frequency offset. The maximum capture range of the pilot phase metrics is determined by the number of pilot subcarrier symbols present in the evaluation range. When pilot arrangements according to FIG. 4 are used, the capture range may be more than half a DFT length.

Figure 2:
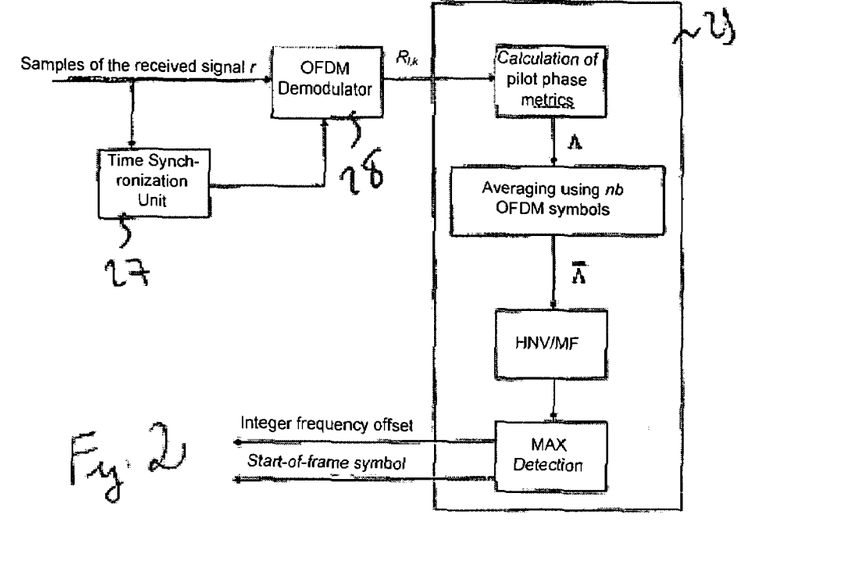
FIG. 2 shows a schematic block diagram for the pilot phase metrics.

FIG. 2 now shows as a schematic circuit diagram the method according to the present invention that takes place in the receiver. The sampled values of reception signal r that have been obtained by analog-digital converter 16 are fed to a time synchronization unit 27 and an OFDM demodulator (=DFT unit) 28. Time synchronization unit 27 performs a rough time synchronization on the basis of the guard interval contained in the received signal. More precisely, the beginning of the guard interval and hence the beginning of an OFDM symbol is sought by calculating an autocorrection.

The data R(l,k) demodulated with OFDM demodulator 28 are then routed to a calculation of the pilot phase metrics in a processor 29. The resulting value Λ is sent to an averager of a specified number of OFDM symbols, in order to calculate a mean for Λ. This is also carried out in processor 29. This correlation value $\overline{\Lambda}$ is then evaluated either with a main to secondary peak ratio or with a merit factor as shown above, this evaluation also being performed in processor 29.

The indices of the maximum value of the measure of correlation quality thus calculated give the position of the start-of-frame symbol and the rough frequency offset. In other words, the result at the output of processor 29 is the frequency offset in integral multiples of the subcarrier frequency interval, and the start-of-frame symbol is found in the detection of the maximum value. The receiver thus searches through the received subcarrier symbols value by value with a stored pilot phase profile. If a maximum possible agreement between the stored pilot phase profile and the received pilot phase profile is reached, the start of the frame has then been found and the rough frequency offset detected.

Figure 3:
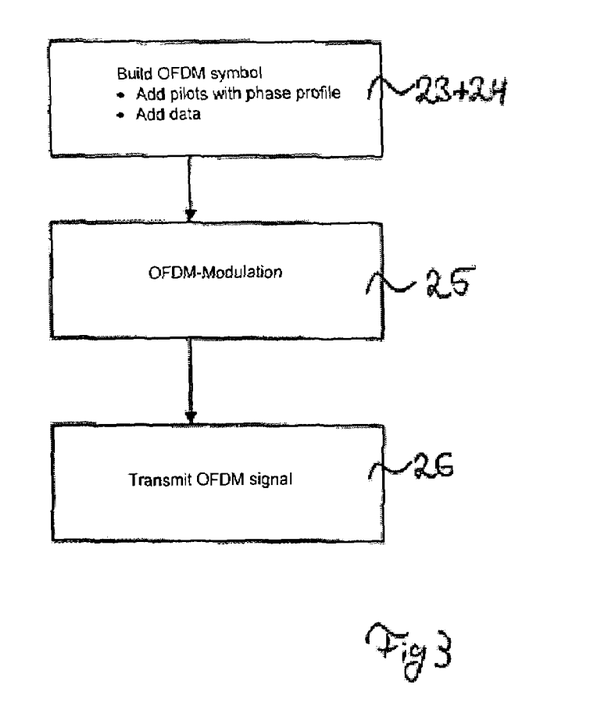
FIG. 3 shows a flow chart of the method according to the present invention for transmitting the OFDM signal.

FIG. 3 shows in the form of a flow chart the method according to the present invention that takes place in the transmitter. In a first method step 23 the pilots and the useful symbols to be transmitted are mapped to an OFDM symbol. At the same time, the unique phase profile is impressed on the pilots (method step 24). The resulting OFDM symbol is then fed to OFDM modulator 10 and 11 (method step 25), in order to generate an OFDM signal. In addition, a guard interval is also added in the OFDM signal. In block 13 the OFDM signal is transmitted (method step 26).

What is claimed is:

1. A method for a frame and frequency synchronization of an OFDM (orthogonal frequency division multiplexing) signal, the OFDM signal being used to receive an OFDM symbol, each of which has a pilot symbol as a subcarrier symbol, the method comprising:
    adding an additional phase rotation to the pilot symbol;
    transmitting the pilot symbol including the additional phase rotation;
    performing a comparison of the subcarrier symbol with at least one pilot phase profile that is stored; and
    performing the frame and frequency synchronization of the OFDM signal as a function of the comparison;
    wherein the pilot phase profile is unique to each different OFDM symbol.

2. A method for transmitting an OFDM signal, the OFDM signal being used to transmit an OFDM symbol having a subcarrier symbol, comprising:
    appending a guard interval to the OFDM symbol;
    transmitting the subcarrier symbol as at least one pilot; and
    impressing an additional phase rotation phase on the at least one pilot prior to transmitting, so that at least one pilot phase profile results, the transmitted at least one pilot including the impressed additional phase rotation phase;
    wherein the pilot phase profile is unique to each different OFDM symbol.

3. The method as recited in claim 1, wherein:
    a unique pilot phase profile is produced by adding the additional phase rotation to the pilot symbol in a transmission frame.

4. The method as recited in claim 1, further comprising:
    prior to the comparison of the subcarrier symbol with the at least one pilot phase profile, performing a rough time synchronization by searching for a guard interval in the OFDM signal.

5. The method as recited in claim 1, wherein:
    the comparison is performed using a cross-correlation, and
    the cross-correlation is then evaluated to determine the frame and frequency synchronization.

6. A method for a frame and frequency synchronization of an OFDM (orthogonal frequency division multiplexing) signal, the OFDM signal being used to receive an OFDM symbol, each of which has a pilot symbol as a subcarrier symbol, the method comprising:

adding an additional phase rotation to the pilot symbol;
performing a comparison of the subcarrier symbol with at least one pilot phase profile that is stored; and
performing the frame and frequency synchronization of the OFDM signal as a function of the comparison;
wherein:
the comparison is performed according to the following equation:

$$\Lambda(l, p(l,k), s, i) = \text{ABS}\left[\sum_k W^*(l, p(l,k)) \cdot W(l, p(l, k+1)) \cdot R(s, p(l,k)+i) \cdot R^*(s, p(l, k+1)+i)\right].$$

7. The method as recited in claim 2, wherein:
the at least one pilot phase profile is determined by one of an equation and a pseudo-random series.

8. A method for transmitting an OFDM signal, the OFDM signal being used to transmit an OFDM symbol having a subcarrier symbol, comprising:
appending a guard interval to the OFDM symbol;
transmitting the subcarrier symbol as at least one pilot; and
impressing an additional phase rotation phase on the at least one pilot prior to transmitting, so that at least one pilot phase profile results;
wherein:
the at least one pilot phase profile is determined by the following equation:

$$P_{l,p(l,k)} = \sqrt{2} \cdot W_{p(l,k)} = \sqrt{2} \cdot e^{j\frac{\pi \cdot p(l,k)^2}{N_0}} \cdot e^{j\varphi_{RND}(l,k)}.$$

9. A method for transmitting an OFDM signal, the OFDM signal being used to transmit an OFDM symbol having a subcarrier symbol, comprising:
appending a guard interval to the OFDM symbol;
transmitting the subcarrier symbol as at least one pilot; and
impressing an additional phase rotation phase on the at least one pilot prior to transmitting, so that at least one pilot phase profile results;
wherein:
the at least one pilot phase profile is determined by the following equation:

$$\varphi_{RND}(l, p(l,k)) =$$
$$\varphi_{RND}(l, k_l + ixy) = \arg\{Z(l)\} + 2\pi \cdot xy \cdot \frac{T_G + l \cdot T_S}{T_U} \cdot i + 2\pi \cdot \frac{i^2(1+l)}{P_0}.$$

10. The method as recited in claim 2, wherein:
the at least one pilot is distributed uniformly in an OFDM symbol.

11. The method as recited in claim 5, wherein:
a main to secondary peak ratio is used to evaluate the cross-correlation.

12. The method as recited in claim 5, wherein:
a merit factor is used to evaluate the cross-correlation.

13. A transmitter, comprising:
a memory containing a pilot phase profile;
an OFDM modulator;
an antenna that radiates an OFDM signal; and
a device for feeding at least one pilot with the pilot phase profile, an additional phase rotation being added to the pilot by the pilot phase profile;
wherein the pilot phase profile adding the additional phase rotation:
includes a set of at least one element that results after (a) discarding data carriers of an OFDM symbol of the OFDM signal and (b) taking arguments of remaining pilot subcarriers; and
is unique to each different OFDM symbol.

14. A receiver for receiving an OFDM symbol of an OFDM signal, the OFDM symbol including a pilot symbol as a subcarrier symbol, comprising:
a first time synchronization unit for performing a rough time synchronization;
an OFDM demodulator; and
a processor including a memory for:
performing a comparison between the received subcarrier symbol and a stored pilot phase profile, the received subcarrier symbol including an additional phase rotation added prior to transmission; and
performing a frame and frequency synchronization of the OFDM signal as a function of the comparison;
wherein the pilot phase profile is unique to each different OFDM symbol.

* * * * *